United States Patent [19]

Reef

[11] 3,771,229

[45] Nov. 13, 1973

[54] DOUBLE ACTING GAGE

[76] Inventor: Jan Reef, 41520 Eight Mile Rd., Northville, Mich. 48167

[22] Filed: Feb. 18, 1971

[21] Appl. No.: 116,511

Related U.S. Application Data

[63] Continuation-in-part of Ser. No. 11,273, Feb. 13, 1970, abandoned.

[52] U.S. Cl. .......................... 33/147 M, 33/179.5 E
[51] Int. Cl. ........................... G01b 5/08, G01b 5/16
[58] Field of Search ..................... 33/147 R, 147 A, 33/147 B, 147 F, 147 G, 147 H, 147 K, 147 L, 147 M, 147 N, 178 R, 179.5 A, 168 B, 174 R, 147

[56] References Cited
UNITED STATES PATENTS

| | | | |
|---|---|---|---|
| 2,636,379 | 4/1953 | VanDorn | 33/DIG. 17 |
| 2,492,369 | 12/1949 | Robins | 33/174 L |
| 3,299,516 | 1/1967 | Reef | 33/147 F |
| 2,728,144 | 12/1955 | Nilssen | 33/147 M |
| 2,561,534 | 8/1951 | Parker | 33/147 M |
| 1,635,908 | 7/1927 | Stuart | 33/178 R |
| 3,067,520 | 12/1962 | Geraghty | 33/147 K |

Primary Examiner—Louis R. Prince
Assistant Examiner—A. J. Mirabito
Attorney—Burton & Parker

[57] ABSTRACT

This disclosure relates to a double acting gage wherein there are two gage blade assemblies mounted in opposed spaced apart relationship on a supporting base, as for example one on the outer ends of each of the two arms of a horseshoe shaped frame. There are two separate modifications shown. In one modification the gage blade is spring urged toward the gage blade of the other gage blade assembly and so is the blade supporting channel thereof. In the other modification the gage blade and its supporting channel are each spring urged in the opposite direction. The gage is therefore operable to measure outside diameters and inside diameters of a toothed ring gear. The permitted movement of the gage blade within its channel plus the permitted movement of the gage blade channel itself increases substantially the amount of movement of one gage blade with respect to the other gage blade to permit a larger piece of work such as a toothed gear to be passed between said blades. While the registration of the movement of the gage blade along within its channel is that which is disclosed on the dial indicator, this is so because the dial indicator is carried by the gage blade channel element in its movement toward and away from the other gage blade.

8 Claims, 10 Drawing Figures

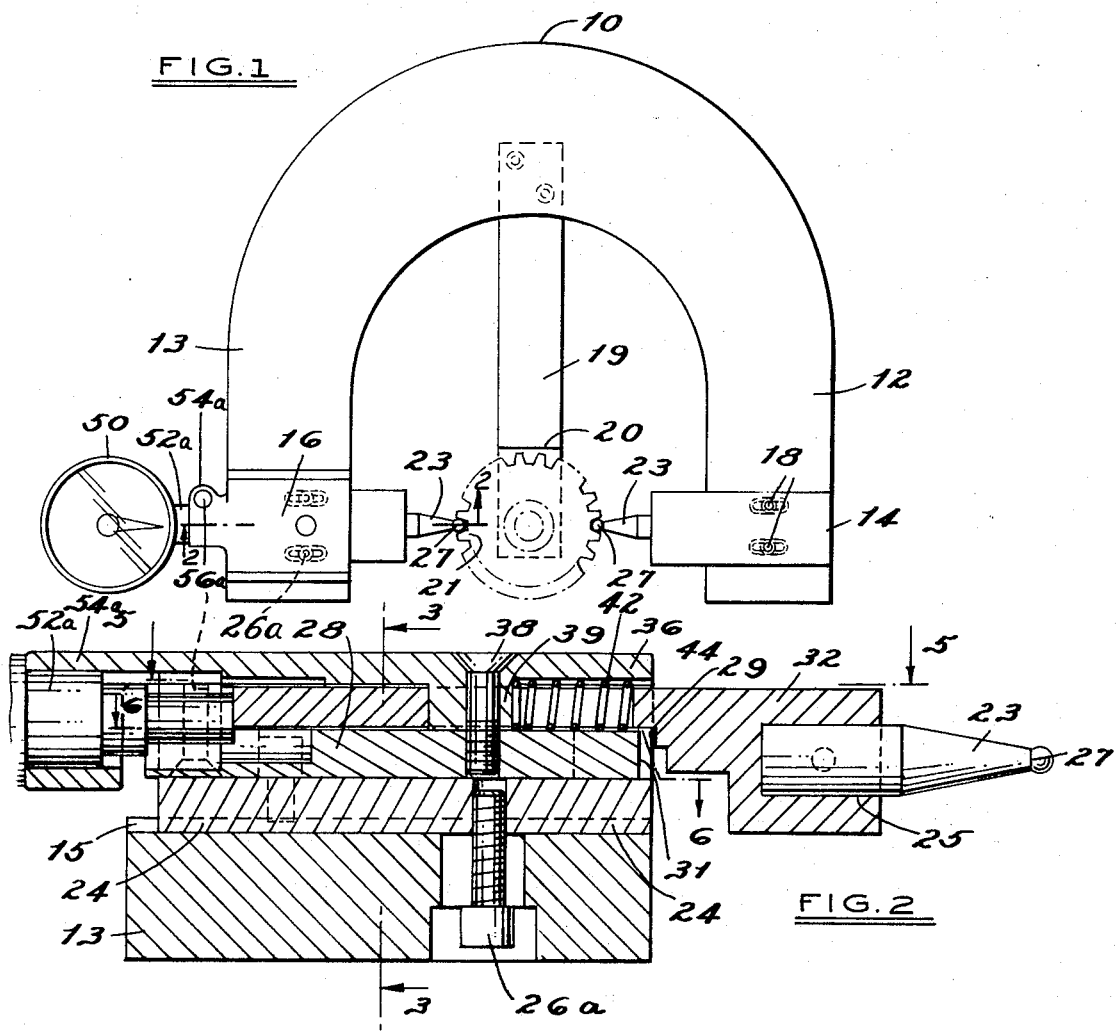
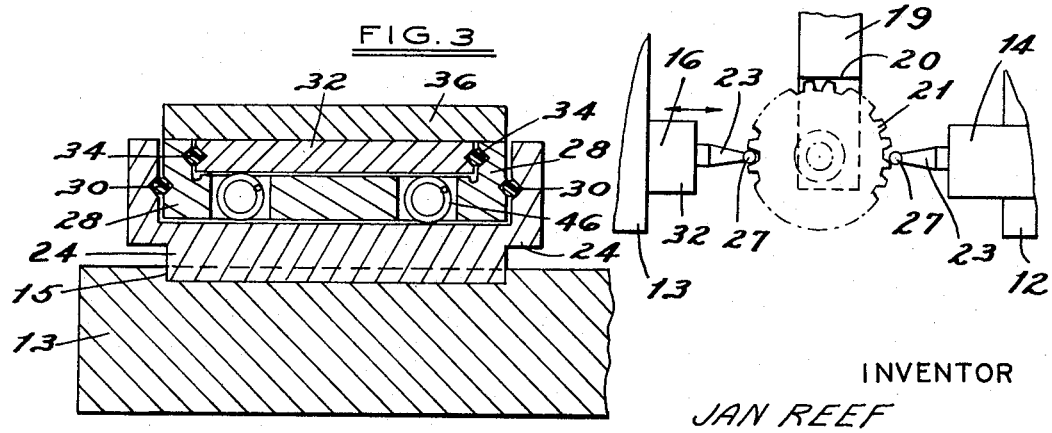

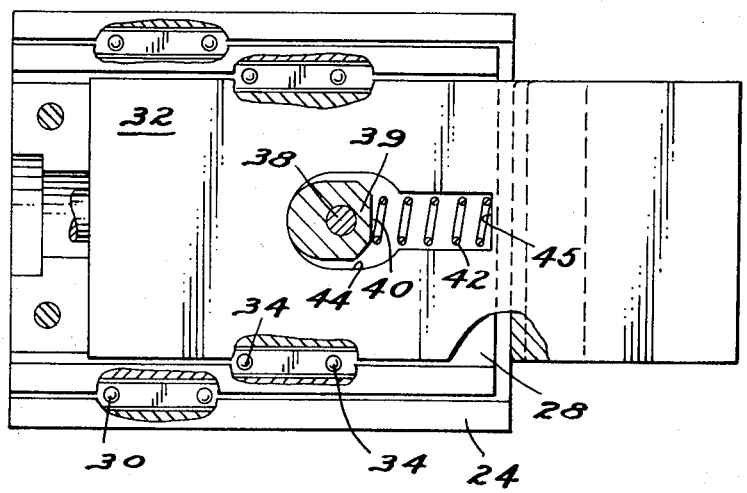
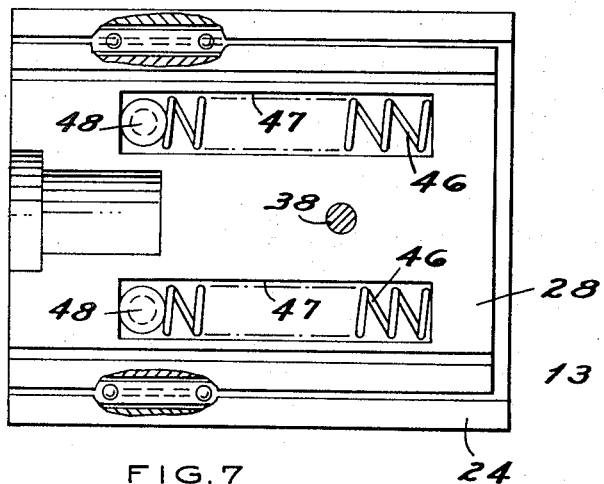
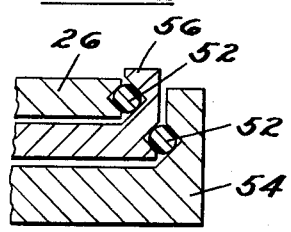

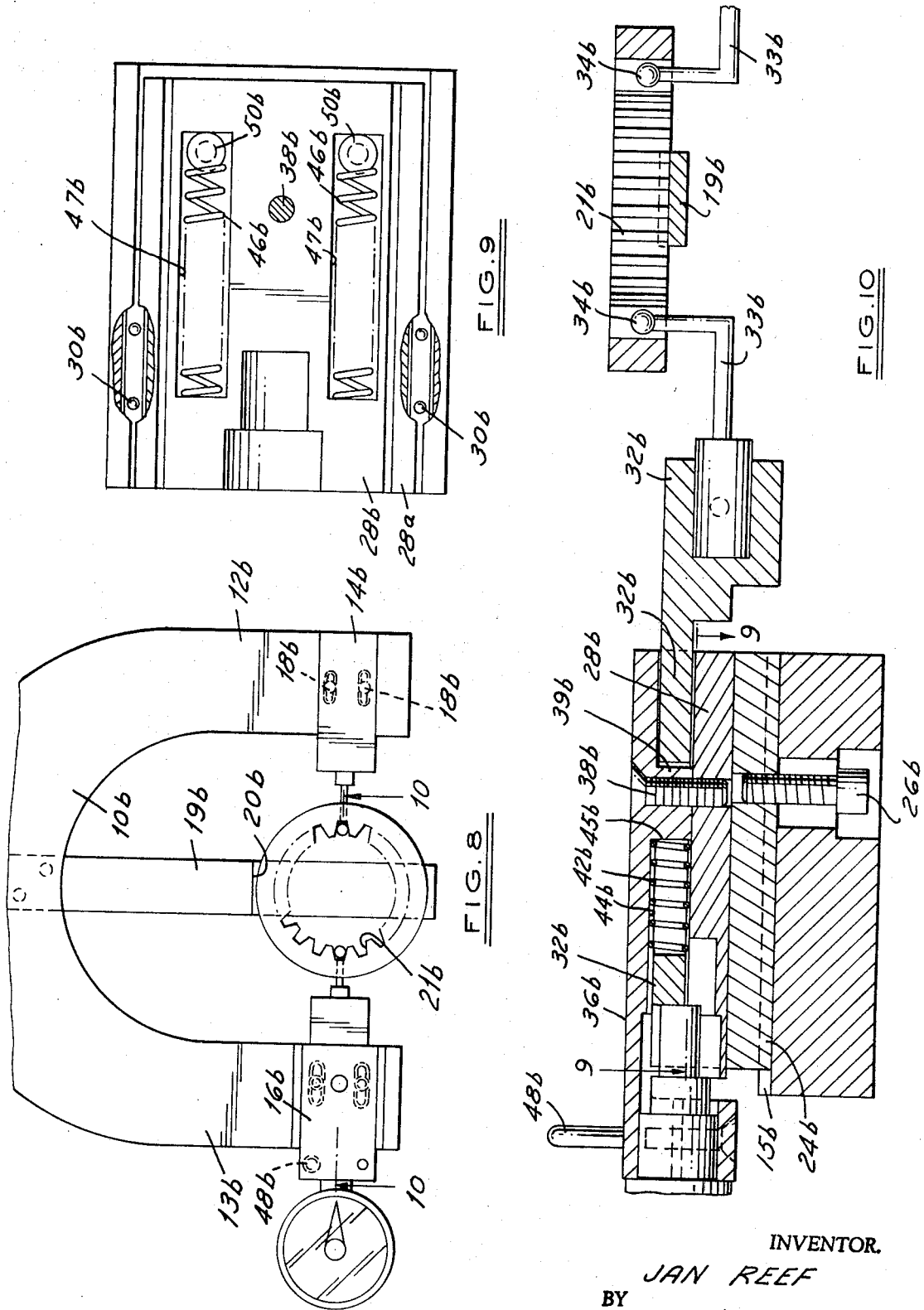

DOUBLE ACTING GAGE

CROSS-REFERENCES TO RELATED APPLICATIONS:

This application is a continuation-in-part of application Ser. No. 11,273, filed Feb. 13, 1970, now abandoned, by the same inventor. Note particularly FIG. 5 of said application Ser. No. 11,273 and that portion of the summary beginning with line 8 on page 3 and continuing then to the end of the paragraph on the same page. Note also the description of FIG. 5 beginning on page 6, starting with the paragraph in line 14 and continuing to the end of the specification preceding the claims. The Specification preceding the claims terminates with the reference to claim 6 which is directed to this modification shown in FIG. 5 of U. S. application Ser. No. 11,273. FIG. 5 illustrates a gage blade of a similar character in many ways to the gage blade here shown, and which gage blade is slidably supported for reciprocable movement within a channel element itself, which channel element is also slidably supported for similar reciprocable movement to that of the blade within the channel element.

There are no other patent applications or patents that are believed pertinent to the subject matter of this application except those of applicant recited in Application Serial No. 11,273, and being applicant's Pat. Nos. 2,562,124, dated July 24, 1951, and 3,299,516, dated Jan. 24, 1967.

SUMMARY OF THE INVENTION:

In this invention wherein two gage blade assemblies are disposed in spaced apart opposed relationship with respect to each other, one gage blade assembly might well be termed a double acting gage blade assembly within which the gage blade is mounted in a gage blade channel for reciprocable slidable movement and the channel itself is supported for reciprocable slidable movement within a temporarily stationary gage blade channel whereby both the gage blade and its channel element are slidably reciprocable with respect to the other gage blade assembly. This arrangement ensures that workpieces of larger size such as a toothed gear, may be passed between the two gage blades when they are disposed farthest apart. The construction shown embodies two modifications, one as shown in FIGS. 1 to 7 wherein the measurement is an external one, and the other, shown in FIGS. 8 to 10, wherein the measurement taken is an internal one. The gage blade channel movement is not added to the movement of the gage blade to give a joint reading of both these parts, but indicates only the reading of the gage blade with respect to the channel within which it is mounted. The supplemental movement of the gage blade channel itself is only for permitting a greater movement apart of the two gage blades to permit acceptance of a larger piece of work therebetween.

When manual pressure is exerted against the slidable gage blade point to urge such either outwardly or inwardly, as the case may be, against its spring, such slidable gage blade picks up the slidable gage blade channel element within which the blade moves, and the two are manually moved against their springs to a maximum position, where they permit a larger piece of work to be passed between the two gage blades to the correct position for checking. The gage blade itself and the gage blade channel both move counter their springs so as to position the work properly between the two blades. Release of such manually shifted gage blade itself and of the gage blade channel permits the gage blade and its channel to move in the first modification toward the other gage blade until it is brought to a stop by engagement with the spring stop pins. As the gage blade channel is thus arrested it is the further movement of the gage blade with respect to its arrested channel that is measured on the dial indicator. In the second modification the movement of the spring actuated parts is in the opposite direction.

The dial indicator is a very sensitive one reading in very small units, and its extent of movement is thereby limited because, if the dial indicator were moved too far, its mechanism would not function properly. By providing for movement of the gage blade channel element itself to be added to that of the gage blade, it is possible to pass a larger piece of work between the points of the two gage blades than if one depended upon the movement of the gage blade alone relative to its blade supporting channel particularly for receiving large work parts therebetween.

DESCRIPTION OF THE DRAWINGS

In the drawings, FIG. 1 represents a plan of the first modification of the gage structure as illustrated in this application, showing a piece of work, in the form of a toothed gear, upon which the gage is being used to measure outer gear teeth;

FIG. 2 is a cross-section view taken through one of the arms of the horseshoe gage as shown on line 2—2 of FIG. 1;

FIG. 3 is a cross-sectional view taken on the line 3—3 of FIG. 2;

FIG. 4 is a plan view of the toothed gear and fragments of opposed gage blade indicator points which engage the gear between successive teeth on both sides thereof, and a plan of a portion of the plate support for the work (gear) showing the gear at an intermediate position in the movement of inserting the gear between the points of the two opposed gage blades and the points of the gage blades into the spaces between two successive gear teeth on opposite sides of the gear;

FIG. 5 is a view taken on the line 5—5 of FIG. 2;

FIG. 6 is a sectional view taken on the line 6—6 of FIG. 2;

FIG. 7 is a duplication of FIG. 5 shown in Application Ser. No. 11,273 filed Feb. 13, 1970, of which this is a continuation-in-part, and is described in the earlier application as a fragmentary cross-section showing the guideway within which the slidable blade is mounted as itself being in the form of a supplemental slidable guideway likewise supported for endwise slidable movement against the same type of plastic rods as shown in FIGS. 2 and 3 of said Application Serial No. 11,273;

FIG. 8 is a plan view of the second modification of the gage structure shown herein, wherein the construction is adapted to check internal measurement of an internal toothed gear instead of external measurements;

FIG. 9 is a plan view of the structure shown on the cross-section line 9—9 of FIG. 10; and FIG. 10 is a cross-sectional view of the structure shown on the cross-sectional line 10—10 of FIG. 8.

DESCRIPTION OF THE PREFERRED EMBODIMENTS:

In the structure shown in the drawings, the horseshoe shaped frame 10 has spaced apart arms 12 and 13, FIGS. 1 and 8. Each of these arms has an outer end that supports a gage blade assembly as shown in FIGS. 1 and 8. The gage blade assembly on arm 12 (FIG. 1) is indicated as 14 and the gage blade assembly on arm 13 (FIG. 1) is indicated as 16.

Confining the description first, to that modification shown in the first seven Figures of the drawings: The gage blade assembly 14 is adjustable with respect to its supporting arm 12 as shown, by adjustment of the screws or pins 18 through slots formed transversely in the arm, shown only in dotted outline in the drawing. This is an adjustment which positions the gage blade assembly transversely with respect to its supporting arm 12 so as to position the point of the gage blade in the guideway with respect to work that may be mounted upon a supporting plate 19 which is provided with a shoulder 20 and which work is shown in the drawing as a toothed gear 21.

This gear 21 is received upon one side of a supporting plate 19 for manual slidable movement thereover to move the gear between the points of the gage blades of the two gage blade assemblies as hereinafter described. The toothed gear 21 shown may be placed upon the plate 19 at the outer side of the shoulder 20. The gear 21 is adjustable over the plate 19 so that the toothed gear itself may be so disposed that the tapered pointed ends 23 of the gage blades are positioned within the space between successive teeth on opposite sides of the gear as shown in FIGS. 1 and 4. The gage blade assembly 14 is relatively stationary on its arm but can be adjusted to different positions upon its supporting arm 12 of the stationary horseshoe shaped frame as desired.

The gage blade assembly 16, arm 13, is mounted within a stationary channel in its arm 13 as shown in FIGS. 2 and 3. There is a stationary base channel 24, secured directly to the arm 13, within a shallow channel 15 (see FIGS. 2 and 3) by screws, one of which is shown as 26a. This element (the screw 26a) is given the number 26a to prevent conflict with the number 26 used in FIG. 5 of Application Serial No. 11,273 of which this application is a continuation-in-part, for such FIG. 5 of Application Serial No. 11,273 is added to the instant application as FIG. 7. A screw 26a which extends upwardly through the arm 13 of the horseshoe and into the channel base 24 is shown in FIG. 2 as securing the base channel 24 to the arm 13 of the horseshoe.

Within this base channel 24 which is secured to the arm 13 of the horseshoe there is slidably mounted a gage blade supporting channel element 28. This gage blade supporting channel element 28 is slidably supported within the channel base 24 by bearings 30. These may be steel ball bearings of common construction or they may be plastic bearing rods as described in Application Ser. No. 11,273 of which this particular application is a continuation-in-part. The channel element 28 which is slidably supported within the stationary guideway of base 24 carries the gage blade 32 therein for slidably reciprocable movement toward and away from the other gage blade assembly 14. The slidable movement of the blade 32 within channel 28 is facilitated by bearings 34, shown in FIG. 3.

FIG. 5 shows in plan the support for this gage blade 32. The blade 32 shown in FIG. 5 and its supporting channel element 28 do not show the blade as having a tapered pointed end 23 as illustrated in FIGS. 1, 2 and 4 of the drawings. However, in FIG. 2 the pointed end 23 is indicated as a separate part which is in the form of an elongate pointed element that is received within a socket 25 in the block end of the blade 32 so that readings may be taken as shown of successive teeth of a toothed gear.

There is a cover plate indicated in FIGS. 1, 2 and 3, as 36, which extends over the blade 32 and over the upper edges of the walls of the slidable channel element 28 which carries the blade 32, all as shown particularly in FIGS. 2 and 3. This cover plate does not extend over the upper edges of the walls of the stationary channel base 24 but extends only over the edges of the walls of the slidable channel 28 as shown particularly in FIG. 3.

This cover plate is secured to the slidable channel element 28 by a screw 38, see FIGS. 2 and 5. This screw 38 extends through a boss 39 carried by the cover plate 36 as shown best in FIGS. 2 and 5. This boss has a flatted side 40 which is engaged by one end of an expansion spring 42, the opposite end of which spring engages an end 45 of an aperture 44 shown best in FIG. 5. This opposite end of the aperture is also shown in FIG. 2, and the spring tends to hold the gage blade 32 inwardly of the horseshoe shaped frame toward the gage blade of the opposite gage blade assembly which is shown in FIGS. 1 and 4.

This gage blade 32 is shown, in FIGS. 2 and 4, as provided with a pointed, tapered portion 23 which terminates in a ball end 27. This ball end is shown in FIG. 4 as the outer end of the pointed tapered element 23 and is receivable within spaces between successive teeth of the gear wheel as illustrated in FIGS. 1 and 4.

It will be seen that this gage blade itself indicated as 32, is adapted to be projected by the expansion spring 42 which projects the pointed end of the blade as illustrated in FIGS. 1 and 5 into a space between two successive gear teeth of the gear wheel 21. This blade 32 is normally held outwardly of the blade assembly (inwardly of the horseshoe shaped frame and toward the opposed blade assembly 14) by the expansion spring 42 and this holds the blade itself outwardly at its outer limit of movement as shown in FIG. 2. The gage blade structure 32 is shown in FIGS. 2 and 5, as slidably supported within the gage blade supporting channel element 28. This gage blade supporting channel element 28 is shown in FIGS. 3 and 5 as held outwardly by two springs 46, shown best in cutout openings 47 in FIG. 6.

When the gage channel element 28 is forced rearwardly by manual pressure against the outer end of the blade 32 or the pointed end thereof 23, which is done to separate the opposed gage blades of the two gage blade assemblies, 14 and 16, to permit a large toothed gear or other piece of work to pass therebetween, it will be seen that there is a shoulder 29 on the blade 32, FIG. 2, which engages the end portion 31 of the gage blade supporting channel element 28 as shown particularly in FIG. 2, thereby picking up the channel element 28 to travel rearwardly with the blade 32 counter the blade spring 42 and counter the two channel springs 46.

In this FIG. 2 the shoulder 29 is not shown as bearing against the end of the blade supporting channel 28 but it is apparent that as the blade element 32 is pushed rearwardly manually against its spring 42 that the spring will be compressed so that the shoulder 29 will engage the end 31 of the channel 28 so as to urge such channel rearwardly against its springs 46 and compress them against the pins 48, which pins are carried by the stationary channel base 24. The springs 46 are compressible within slots 47 which are formed in the slidable channel element 28 that carries the gage blade and are best shown in FIG. 6, which shows a view taken on line 6—6 of FIG. 2, and with the slidable gage blade 32 removed. Normally the two springs 46 are stronger than the one spring 42 that urges the gage blade outwardly, and they would carry the gage blade outwardly as the gage blade channel was itself projected outwardly by its two springs 46.

When the movement of the gage blade carrying channel element 28 is arrested by the pins 48 compressing the springs 46 against the ends of the slots 47 the gage blade is then continued in its outer propulsion by its own spring 42. In this movement the blade will travel relative to the arrested gage blade channel element and the movement of such gage blade relative to the arrested gage blade channel element will be the movement registered on the dial indicator.

It is understood that as shown in FIGS. 2 and 4 the gage blade 32 will move outwardly under the impulse of its own spring 42 and the dial indicator 50 will register such advance against the arrested gage blade channel element 28. The dial indicator 50 will be seen in FIG. 2 as carried by the cover element 36. This is also shown in FIG. 1. The dial indicator 50 is shown in FIGS. 1 and 2 as having a cylindrical portion 52a that is secured within a socket portion 54a of the slidable channel element 28 and held therein by a screw 56a as shown in FIG. 1. It is also so shown in FIG. 2.

It will be seen therefore that the dial indicator is carried actually by the slidable blade carrying channel element 28 through the adjustment of the screw 56a to fasten the socket element of the cover about the cylindrical projecting portion 52a of the dial indicator. The dial indicator therefore travels with the slidable channel 28 (note screw 38, FIGS. 2 and 5) so that the only measurement that is taken by the dial indicator is a measurement of the movement of the gage blade 32 relative the arrested gage blade channel element 28 when such movement of channel element 28 is arrested.

In connection with the measurement of accuracy of the gear teeth the gear will be manually inserted between the pointed ends of the two opposed gear blades. The gear blade of the assembly 16 when pushed back manually will in turn push the slidable blade channel carrying element 28 back against its springs so that there is sufficient distance between the beaded ends of the pointers 23 of the two gear blades to permit them to receive the gear between them as shown in FIGS. 1 and/or 4.

It will be seen from FIG. 4 that the gear wheel 21 may be engaged over the projected ball end 27 of the pointer 23 of the blade 32, all as shown in FIG. 4. The gear 21 is then rolled into the position from that shown in FIG. 4 to that shown in FIG. 1. At this latter position it will be noted that the gear is withdrawn slightly from the shoulder 20 on the supporting plate 19 and is free to slidably adjust itself to the position as shown in FIG. 1 where the ball ends 27 of the two pointer members 23 are seated within the spaces between successive teeth on opposite sides of the gear wheel.

In applicant's co-pending Application, Ser. No. 11,273, filed Feb. 13, 1970, of which this application is a continuation-in-part, there appears the following detailed description of FIG. 5 (FIG. 7 in this application), as follows, beginning at line 14, page 6 of application Ser. No. 11,273:

"FIG. 5 illustrates another modification wherein the cutout channel in the frame or one of the arms of the U-frame as shown in FIG. 1 is indicated as 54, and the guideway 56 is a guideway slidably supported within the channel cutout in the frame as shown in FIG. 5. This guideway is supported for slidable movement by teflon rods 52 and the opposite side of the guideway, due to the structure shown in FIG. 5 being a fragment of only one side, is similarly supported upon a plastic rod and such are disposed within the cutouts shown in the stationary channel guide of the frame and the slidable guideway 56.

"The blade which may be indicated by the same numeral 26 as used to identify the blade in FIGS. 2 and 3, is carried within the slidably supported guideway 56. It will be seen that with this kind of a construction the extent of total slidable movement of the blade 26 would be substantially greater than that of the blade 26 shown in FIG. 2 wherein the only permissible slidable movement is provided by the blade itself. In FIG. 5 the permissible slidable movement of the blade is increased by the permissible slidable movement of the reciprocating guideway 56.

"This is what might be termed a double acting unit and is designed so that a standard 0.0001 inch thousand indicator with a total travel of 0.025 of an inch can be used. In many cases where dimensions have to be checked like gear teeth or threads it becomes necessary to have a greater lifting or opening of a gage which exceeds 0.025 inch. This unit is designed to travel a greater length after th normal length of approximately 0.015 inch is used of the 0.025 inch range, and the second slide takes over up to 0.500 inch, or as desired.

"Heretofore, an indicator of from 0.050 inch to 0.400 inch had to be used and these indicators have a limited reading of from 0.0005 inch to 0.001 inch. Some, however, were provided with a 0.0001 inch indicator reading and then with a revolution counter which in many cases were misread. With this double acting instrument the gage is depressed by placing the upper blade on the work to be checked and then the lower part is moved inwardly until the stop of the gage contacts the work. Hand pressure is then released and the gage pressure springs take over and locate themselves in the proper teeth and the gage is read for size. This double acting slidable blade and slidable blade guideway for the blade is believed to be novel whether teflon rods or standard ball bearings are used, and is so claimed in claim 6."

It is believed that the above is proper in this application because it shows the extent of which the disclosure of FIG. 5 (FIG. 7 in this instant application) was set forth in the said earlier Application Ser. No. 11,273, and such disclosure is thought to be proper here for it would apply to the instant application which is a continuation-in-part of said earlier Application Ser. No. 11,273.

The attorney has described the construction and operation of the first seven Figures of the drawings which relate to external measurements of a part being measured, such as measurements of gear teeth of an external gear. The remaining Figures of the drawings in this application, FIGS. 8, 9 and 10 herein, which represent the second modification of the invention herein disclosed, relate to internal measurements such as measurements of gear teeth of an internal as distinguished from an external gear. The parts of the gage presented for patent herein are all generally the same, except that the measurements being made on the piece of work illustrated in FIGS. 8, 9 and 10, the second modification, relate to a gage measuring an internal toothed gear, rather than an external one, as shown in FIGS. 1 through 7, and differ in that respect.

FIG. 8 is the general Figure for the second modification, which resembles FIG. 1 and varies from the structure of FIG. 1 only in that it is provided with parts adapted to measure the faces of an internally toothed gear rather than an externally toothed one, and that the parts of the mechanism work in the opposite direction from that shown in FIG. 1. For the sake of simplicity the attorney is using the same numerals to indicate the same parts of the mechanism in the first seven Figures of the drawings except that in FIGS. 8, 9 and 10, the second modification, the parts are all identified by the addition of the letter "b" to the numeral. In other words, the horseshoe shaped type of base carrying the two gage assemblies at the opposite ends of the two arms is indicated as 10b instead of merely 10 as in FIG. 1 of the first modification. The arms of this horseshoe base are indicated as 12b and 13b and the gage assemblies shown on the outer ends of the two arms are likewise indicated in the second modification as 14b and 16b instead of 14 and 16.

The description and operation of the construction shown in FIGS. 8, 9 and 10 is similar to the description and construction shown in the first seven Figures of the drawing except that as this second modification relates to an internally toothed gear rather than to the externally toothed gear, upon which the apparatus of the first seven Figures is being used, it will be apparent that the operation of certain parts will be in exactly the opposite direction of movement from what is shown in the use of the construction in the first modification.

Describing from now on only FIGS. 8, 9 and 10, the second modification, the internal gear is identified as 21b, the supporting plate indicated as 19b, and the shoulder on such plate is indicated as 20b. The work gear itself is movable freely over the supporting plate 19b to such position as desired. The ball ends 34b of the gage blade extensions 33b may be positioned within the spaces between successive teeth as shown in FIG. 10. As stated with respect to the first modification, the gage blade assembly on the arm 12b of the horseshoe is relatively stationary. Its blade can be adjusted as described in the description of the first modification, as appears in paragraph 2 on page 6 hereof.

In the gage blade assembly 16b mounted on the arm 13b of the horseshoe there is a gage supporting channel 15b shown in FIG. 10 within which the relatively stationary channel base 24b is mounted. This channel base 24b is shown as being held to the end of the horseshoe by a screw 26b, which corresponds to the screw 26a in FIG. 1 of the first modification. In the first modification, and particularly as shown in FIG. 3, the channel base member is indicated as 24 and corresponds to the channel base 24b shown in this modification in FIG. 8.

The gage blade channel supporting element is indicated as 28b and is provided with bearings 30b which are shown in the first modification as 30. The blade itself which is indicated in FIG. 10 of this second modification as 32b is a blade which is slidably disposed within the channel element 28b. A feature of both these modifications, as described more particularly in connection with the first one, is that the gage blade 32b of this second modification, and the gage blade supporting channel 28b, are each disposed for slidable movement independently of or in conjunction with each other. Both the blade and the blade carrying channel are shown as provided with ball bearings 34, and 30, in FIG. 3, though the bearings 34 indicated in FIG. 3 are not shown in these FIGS. 8, 9 and 10 but are understood as being provided as bearings for support of the blade 32b as shown in FIG. 3 of the first modification. The construction shown in these FIGS. 8, 9 and 10, unlike that shown in the first seven Figures, does not show pointed end gage blades but shows a gage blade having an end extension of angular shape indicated as 33b, having a ball end indicated as 34b. Such ball is receivable between successive teeth of the internally toothed gear 21b as shown in FIGS. 8 and 10 of this second modification.

In the second modification there is a cover plate 36b. This cover plate is secured to the blade supporting channel element 28b by a screw indicated as 38b. This screw extends through a boss 39b which projects downwardly from the cover 36b as shown in FIG. 10, and into the slidable channel 28b. As shown in the construction of FIG. 2 of the first modification, and particularly in FIG. 5 thereof, this boss is flatted on one side so as to better engage the end of the spring indicated as 42b in FIG. 10. The opposite end of this spring, which is an expansion spring, engages an end 45b of a spring aperture 44b shown best in FIG. 5 of the first modification. The spring 42b tends to hold the gage blade 32b inwardly of the blade assembly 16b or away from the opposite blade assembly 14b, all as shown in FIGS. 8 and 10. It operates upon the gage blade 32b to hold such blade in the same direction as the springs 46b hold the blade channel assembly 28b in FIGS. 9 and 10, namely inwardly of the assembly 16b and away from the opposed blade assembly.

The fact that the structures of FIGS. 8, 9 and 10 operate so far as the automatic movement of the blade and the blade carrying channel are concerned in the opposite direction from that shown in the first modification of FIGS. 1 through 7, is due to being used on an internal gear in the second modification, rather than on an external gear. There is a handle portion 48b best shown in FIG. 10 but identified also in FIG. 8. This handle can be grasped by the operator to move the blade carrying channel 28b toward the opposite assembly of the gage and compresses the springs 46b against the pins 50b. These pins are carried by the relatively stationary channel 24b shown in FIG. 10, and project upwardly through slots 47b in channel 28b, FIG. 9.

As the cover plate which is coupled with the slidable channel 28b by the screw 38b as shown in FIG. 10, is moved outwardly from the assembly 16b toward the opposed assembly, the angular extension 33b and its ball end 35b is moved toward the extension of the blade of the assembly 14b. The ball ends move toward each other to a point where they are both readily receivable within internal gear 21b as shown in FIG. 8.

Each of the springs 46b seats at one end directly against the end of its slot 47b and at the other end seats against its pin to push the blade carrying channel away from the opposed blade assembly 18b and away from the pins 50b. The spring 42b has also been placed under compression by movement of the blade 32b toward the other blade assembly 18b. These three springs, the two springs 46b and the spring 42b, tend when the operator releases the handle 48b to move the angular blade elements 33b and particularly the ball ends 34b toward the bottom of the space between successive internal gear teeth as shown in FIGS. 8 and 10.

As described in the first modification, it is the relative movement of the blade as against the stationary position of the blade carrying channel that is measured on the indicator and the blade carrying channel is held by the springs 46b when they are compressed at an arrested stationary position so that the movement which is measured is the relative movement of the blade element 32b as compared with the position of the blade carrying channel 28b, which channel is temporarily being held at a stationary position. In other words, the object accomplished is the same as that accomplished in conjunction with the first modification though the movement of the blade and the blade carrying channel is normally in the opposite direction from that shown in the first modification. In the first modification the springs acting upon the blade carrying channel and also upon the blade, tend to hold such toward the opposed blade assembly. In the second modification the springs act upon the same parts in the opposite direction. The dial indicator is carried by the cover plate or a portion thereof so as to move with the cover plate 36b. The blade carrying channel 28b and the blade 32b itself, are moved counter the springs 46b and 42b to move toward the opposed blade assembly. The springs 42b and 46b return the blade and its blade supporting channel element to their withdrawn positions when pressure is released from the handle.

It will be seen, therefore, that the functioning of this modification is substantially the same as the functioning of the modification shown in the first seven Figures, except that the movement in taking the reading and in engaging the internal teeth of the internal gear being measured is the same as the movement of the mechanism shown in the first seven Figures of the drawing, except that the parts operate in the reverse direction.

What is claimed is:

1. In a gage, a supporting base, two spaced apart, opposed gage blade assemblies carried by the base, one of said assemblies having a shiftable gage blade which is shiftable toward and away from the blade of the other assembly, a channel guideway associated with the assembly having the shiftable gage blade, a gage blade supporting channel element slidably supported for reciprocation within said channel guideway, said shiftable gage blade slidably reciprocably supported within said gage blade supporting channel element for slidable movement therewith and for slidable movement therein relative thereto, first spring means disposed to act upon said shiftable gage blade to urge the same in one direction within said gage blade supporting channel element, said gage blade supporting channel element provided with spring means, stronger than said first spring means, acting thereupon to urge the same within the channel guideway of the supporting base member and in the same direction as the shiftable gage blade is urged by said first spring means within the gage blade supporting channel element, a stop means positioned to arrest the movement of the gage blade supporting channel element at a determined position, an indicator adjustably fastened to said gage blade supporting channel element for shiftable movement therewith, said indicator contacting the shiftable gage blade to indicate the displacement of the shiftable gage blade relative to the gage blade supporting channel element when the channel element's movement has been arrested at said determined position by said stop means, and the shiftable gage blade provided with a shoulder means, adapted to pick up the gage blade supporting channel element, for moving the gage blade supporting channel element counter to its spring means when the shiftable gage blade is actuated a determined distance counter to the first spring means and prior to a full scale deflection of said indicator.

2. The invention as defined in claim numbered 1 characterized in that there are bearings upon which the gage shiftable blade travels, and there are bearings upon which the gage blade channel element travels, and characterized further in that there is stop means positioned to limit the movement of the gage shiftable blade under the influence of the first spring means.

3. The invention as defined in claim numbered 1 characterized in that the first spring means, acting upon the gage blade to urge the blade within its channel guideway wherein it travels, urges the blade toward the other gage blade assembly.

4. The invention as defined in claim numbered 1 characterized in that the first spring means, acting upon the gage blade to urge the blade within its channel guideway wherein it travels, urges the blade away from the other gage blade assembly.

5. The invention as defined in claim numbered 1 characterized in that there is a cover portion disposed over the gage blade supporting channel element and the shiftable gage blade positioned slidably therein, said cover being secured for shiftable movement with the gage blade supporting channel element to travel therewith.

6. In a gage, a supporting base, two spaced apart, opposed gage blade assemblies carried by the base, one of said assemblies having a shiftable gage blade which is shiftable toward and away from the blade of the other assembly, a channel guideway associated with the assembly having the shiftable gage blade, a gage blade supporting channel element slidably supported for reciprocation within said channel guideway, said shiftable gage blade slidably reciprocably supported within said gage blade supporting channel element for slidable movement therewith and for slidable movement therein relative thereto, first spring means disposed to act upon said shiftable gage blade to urge the same in one direction within said gage blade supporting channel element, said gage blade supporting channel element provided with spring means, stronger than said first spring means, acting thereupon to urge the same within the channel guideway of the supporting base member and in the same direction as the shiftable gage blade is urged by said first spring means within the gage blade supporting channel element, a stop means positioned to arrest the movement of the gage blade supporting channel element at a determined position, means for adjustably fastening an indicator to said gage blade supporting channel element for shiftable movement therewith, said indicator to contact the shiftable gage blade to indicate the displacement of the shiftable gage blade relative to the gage blade supporting channel element when the channel element's movement has been arrested at said determined position by said stop means, and the shiftable gage blade provided with a shoulder means, adapted to pick up the gage blade supporting channel element, for moving the gage blade supporting channel element counter to its spring means when the shiftable gage blade is actuated a determined distance counter to the first spring means and prior to a full scale deflection of said indicator.

7. The invention as defined in claim numbered 1 characterized in that there is a dial indicator adjustably fastened to said gage blade supporting channel element for shiftable movement therewith, said dial indicator also solidly contacting said shiftable gage blade to indicate the displacement of said shiftable gage blade relative to the gage blade supporting channel element within which the blade is mounted.

8. A gage blade assembly for mounting in a gage, said gage having a supporting base for receiving two spaced apart opposed gage blade assemblies, said assembly comprising a channel guideway, a gage blade supporting channel element slidably supported for reciprocation within said channel guideway, a shiftable gage blade slidably reciprocably supported within said gage blade supporting channel element for slidable movement therewith and for slidable movement therein, first spring means disposed to act upon said shiftable gage blade to urge the same in one direction within said gage blade supporting channel element said gage blade supporting channel element provided with spring means, stronger than said first spring means, acting thereupon to urge the same within the channel guideway of the supporting base member and in the same direction as the shiftable gage blade is urged by said first spring means within the gage blade supporting channel element, a stop means positioned to arrest the movement of the gage blade supporting channel element at a determined position, means for adjustably fastening an indicator to said gage blade supporting channel element for shiftable movement therewith, said indicator to contact the shiftable gage blade to indicate the displacement of the shiftable gage blade relative to the gage blade supporting channel element when the channel element's movement has been arrested at said determined position by said stop means, and the shiftable gage blade provided with a shoulder means, adapted to pick up the gage blade supporting channel element, for moving the gage blade supporting channel element counter to its spring means when the shiftable gage blade is actuated a determined distance counter to the first spring means and prior to a full scale deflection of said indicator.

* * * * *